Feb. 9, 1960     P. A. KREIDER     2,924,694
TOOL FOR CUTTING AND WELDING PLASTIC MATERIAL
Filed Nov. 25, 1957     2 Sheets-Sheet 1
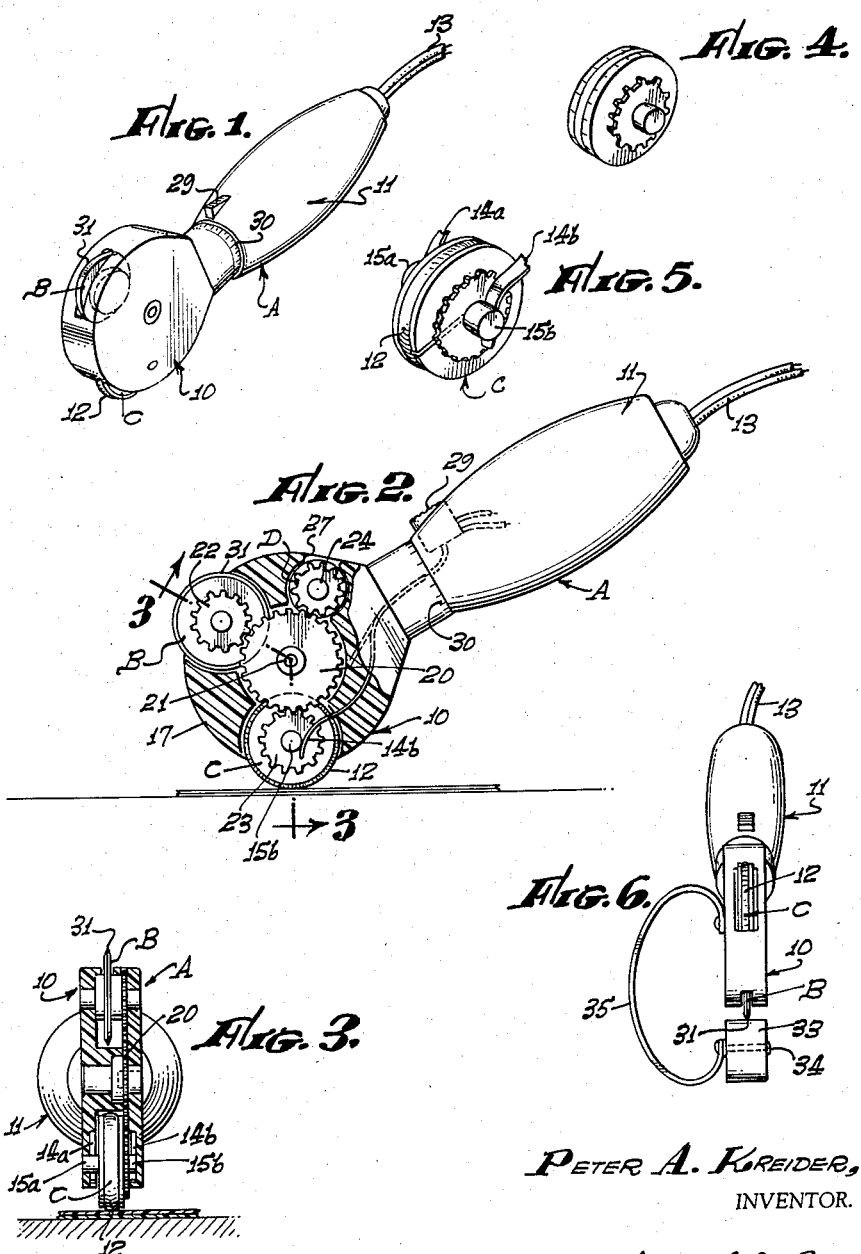
Peter A. Kreider,
INVENTOR.
BY Gene W. Arant
ATTORNEY.

Feb. 9, 1960 P. A. KREIDER 2,924,694
TOOL FOR CUTTING AND WELDING PLASTIC MATERIAL
Filed Nov. 25, 1957 2 Sheets-Sheet 2
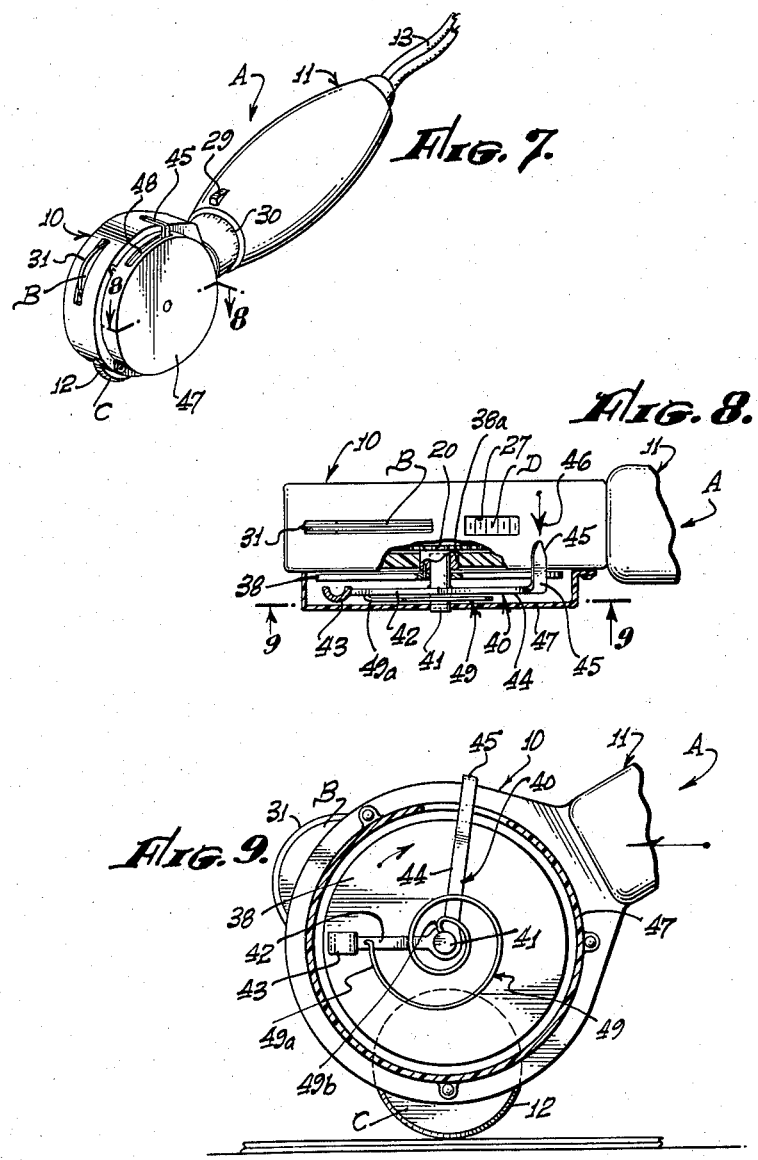
PETER A. KREIDER,
INVENTOR.
BY Gene W. Arant
ATTORNEY.

United States Patent Office 2,924,694
Patented Feb. 9, 1960

2,924,694

TOOL FOR CUTTING AND WELDING PLASTIC MATERIAL

Peter A. Kreider, Whittier, Calif.

Application November 25, 1957, Serial No. 698,723

6 Claims. (Cl. 219—21)

The present invention relates to a tool for cutting or welding plastic sheet material, and which is arranged to perform various cutting and welding steps as part of a single unitary operation.

The use of plastic sheet material has increased very rapidly in recent years as it has many convenient applications, for example, as a wrapper for items of food or the like. It is a great convenience to the housewife to be able to cut and weld sheets of such plastic material as desired in order to provide containers of various sizes and shapes. The tool provided by the present invention is largely intended for such household use, or similar applications.

In welding two sheets of plastic material together (or two edges of same sheet) it has been known heretofore to use a welding wheel having a substantially flat cylindrical surface to which heat may be applied. Difficulties have usually arisen in controlling the temperature of the welding wheel, however, since a number of factors including welding speed affect the rate at which the heat is dissipated.

The plastic sheet material is often transparent, hence it is highly inconvenient to make a direct measurement on the material itself of the length of a cut. It would therefore be desirable to have the length of the cut indicated automatically by the cutting device.

It is therefore an object of the present invention to provide a tool for cutting and welding plastic sheet material which includes counting or measuring means for indicating the length of a cut or a weld.

Another object of the invention is to provide a tool having counting or measuring means of a reversible nature which can be used when first cutting and then welding a sheet of transparent plastic material, in order to insure proper lengths of the cut and the weld without having to make measurements on the material directly.

A further object of the invention is to provide a tool for cutting or welding sheet plastic material and which includes means for controlling the temperature of the welding wheel.

Yet another object of the invention is to provide a tool for cutting or welding plastic sheet material which includes a speed-indicating device adapted to insure the even and continuous application of the proper amount of heat during a welding traverse.

The above and other objects of the invention will become more readily understood from the following description in conjunction with the accompanying drawing in which:

Figure 1 is a perspective view of one embodiment of my invention;

Figure 2 is a side view of the device of Figure 1, partially in cross section;

Figure 3 is a cross-sectional front elevational view of the device of Figure 1, taken on lines 3—3 of Figure 2;

Figure 4 is a perspective view of the counting wheel used in the device of Figure 1;

Figure 5 is a perspective view of the welding wheel of the device of Figure 1, together with electrical connections thereto;

Figure 6 is a front view of another embodiment of my invention;

Figure 7 is a perspective view of a third embodiment of my invention, including a speed indicator;

Figure 8 is a top or plan view of the device of Figure 7, partially in section; and Figure 9 is a view of the device in Figure 7, partially in section and taken on line 9—9 of Figure 8.

Referring now particularly to Figures 1 and 2 of the drawings my invention is seen to include a body structure A including an operating head 10 and a handle member 11. A cutting wheel B and a welding wheel C are each rotatably mounted within the operating head and extend outwardly therefrom on substantially opposite sides thereof so as to be able to operatively engage a sheet of plastic material.

Welding wheel C has a substantially flat cylindrical welding surface 12 (see Figure 5).

Means are also provided for electrically heating the welding surface of the welding wheel, including an electrical cord 13 which runs throughout the length of handle member 11 and supplies electrical current to a pair of brushes 14a, 14b which slidably engage electrical contacts 15a, 15b on the welding wheel C as it rotates (see Figure 5).

Reversible counting means are provided in the form of a counting wheel D whose relative position indicates the length of a traverse of the cutting wheel B or the welding wheel C, whichever has been operative. In this connection it will be noted from Figures 1 and 2 that operating head 10 has substantially the form of a flat, hollow cylinder, and the mounting of wheels B and C on substantially opposite sides thereof makes it virtually impossible for both of said wheels to be operating simultaneously, since the forward portion 17 of operating head 10 would preclude any such action. A central or main gear 20 of the rotary type is mounted on an axle 21 concentrically of operating head 10 and simultaneously engages individual rotary gears 22, 23 and 24 which are concentrically and fixedly mounted upon wheels B, C and D, respectively. Thus, whenever either the cutting wheel or the welding wheel makes an operative traverse on a sheet of plastic material, all of the gears are simultaneously actuated and counting wheel D is displaced by an amount indicating the length of the traverse.

A viewing aperture 27 is provided in operating head 10 through which the relative rotational position of counting wheel D may be viewed, such position being indicated by numerals or other appropriate markings. Also, if desired, a plurality of counting wheels may be used and connected in the conventional cascade fashion so that each drives the succeeding one of the chain.

In the cutting and welding of plastic sheet material it is often necessary to first cut and then weld a predetermined length of the material. The counter makes it possible to first apply cutting wheel B to the plastic material and cut a traverse of the desired length, thus displacing the counter by a predetermined amount from its initial position, and then turn the handle member by half a revolution so that the welding wheel engages the material and move the welding wheel through a traverse having the same length. The action of the gear mechanism as shown is such that the end of the cycle is indicated by the restoration of the counter to its initial setting.

A conventional switch 29 is provided in the handle member for turning on the electrical current. A manually adjustable circular dial 30 is provided, whose setting controls a rheostat or similar device in the electrical circuit and hence determines the rate at which electrical energy is supplied for heating the welding wheel. The structure of welding surface 12 may, if desired, consist of a single continuous wire of the type shown in United States Patent No. 2,430,920 to F. G. Dodge. Connector elements 15a and 15b are insulated from each other, and provided an axle upon which the welding wheel may rotate, as well as receiving the heating current.

Referring specifically to Figure 3 it will be seen that cutting wheel B has a relatively sharp cutting edge 31 which protrudes from operating head 10 by a sufficient distance to cut ordinary thin plastic sheet material. Figure 3 also illustrates how the gears of the device of Figure 1 are aligned in a common vertical plane to provide cooperative functioning of the wheels B, C and D in a very convenient manner. It will, of course, be understood that the present invention is not to be restricted to the particular type of counting mechanism shown but that any other reversible counting mechanism may be used which responds to both the operation of the cutting wheel and the operation of the welding wheel.

Figure 6 illustrates another embodiment of my invention which is identical to the embodiment of Figure 1 except for the inclusion of additional elements. Thus, a cylindrical backing member 33 is provided which is rotatably mounted upon an axle or pin 34. A spring member 35 having suitable length and stiffness connects axle 34 to the pin or axle 21, thus permitting the backing member to be positioned adjacent either the cutting wheel or the welding wheel as desired. This embodiment of the invention is particularly useful where no flat surface is available upon which to place the plastic sheet material while it is being cut or welded. As will be apparent, backing member 34 is adapted to rotate as the plastic sheet material is pulled between it and the oppositely disposed cutting wheel or welding wheel, as the case may be.

Reference is now made to Figures 7-9 illustrating another form of my invention including a speed indicating device adapted to insure the maintenance of a uniform desired welding temperature. The embodiment of Figures 7-9 is identical to the embodiment of Figure 1 except for the inclusion of additional elements. Thus, a rigid aluminum disk 38 is mounted on one side of operating head 10 but is rigidly fastened to main gear 20 so as to rotate concentrically therewith. The central portion of disk 38 includes a cylindrical portion 38a extending through a centrally disposed aperture in the side of operation head 10 and may be welded or fastened by other suitable means to main gear 20. A rigid frame structure 40 includes a pin 41 rotatably positioned within cylinder 38a, a magnet arm 42 extending from pin 41 parallel to disk 38 in a normally horizontal direction, and a magnet 43 fastened to the end of arm 42. Magnet 43 is positioned near the outer edge of disk 38 and is spaced only a short distance therefrom, and it therefore tends to rotate with the disk because of the drag resulting from eddy currents induced in the disk as it passes under the magnet. The rigid frame structure 40 also includes a pointer arm 44 and a pointer 45 at the outer end thereof, pointer 45 being normally positioned in alignment with a normal speed mark 46 on the cylindrical outer surface of operating head 10. Rigid frame structure 40 is substantially enclosed by an auxiliary housing 47 fastened on the outside of operating head 10. An annular slot 48 extending throughout a substantial part of the circumference of auxiliary housing 47 permits the pointer arm 44 to move back and forth as operating speed changes. The rotating force applied to the rigid frame structure 40 by magnet 43 is opposed by a helical spring 49 having one of its ends 49a fastened to the outer end of magnet arm 42 adjacent magnet 43, and its other end 49b fastened to auxiliary housing 47 near pin 41. The pointer position is therefore a direct function of the welding wheel velocity.

In operation, the embodiment of Figures 7-9 provides a very convenient means of regulating the welding temperature which is being applied to the plastic sheet material. It is simply necessary to maintain the pointer 45 at the normal speed mark 46 to insure that the proper speed of traverse of the welding wheel is being maintained. The amount of heat actually dissipated at the surface of the welding wheel is then subject to only minor fluctuations as the supply voltage of the electrical system varies. Where sheet plastic materials of different thicknesses are being used, appropriate speed marks on the exterior surface of the operating head may be used for corresponding thicknesses of the material.

Although my invention is fully capable of achieving the results and providing the advantages hereinbefore mentioned, it is to be understood that it is merely the presently preferred embodiment thereof, and that I do not mean to be limited to the details of construction above described other than as defined in the appended claims.

I claim:

1. A tool for sequentially cutting and then welding a predetermined length of plastic sheet material, said tool comprising, in combination: a body structure including an operating head and a handle member; a cutting wheel and a welding wheel each rotatably mounted on said operating head on substantially opposite sides thereof and each extending outwardly therefrom for engaging the palstic material, said welding wheel having a substantially flat cylindrical surface thereon; means for electrically heating said welding surface of said welding wheel; and reversible counting means cooperatively associated both with said cutting wheel and with said welding wheel and operable for being displaced by a predetermined amount in one direction when said cutting wheel traverses a predetermined length of plastic sheet material, said counting means being operable to be thereafter displaced in the opposite direction and restored to its initial position when said welding wheel traverses the same length of plastic sheet material.

2. A tool as claimed in claim 1 in which said counting means includes a counting wheel having a first rotary gear mounted thereon, and which further includes second and third rotary gears mounted on said cutting wheel and said welding wheel, respectively, and a fourth rotary gear engaging said first, second and third gears simultaneously.

3. A tool as claimed in claim 2 which further includes a cylindrical backing member, a pin positioned axially therein, and spring means interconnecting said pin and said operating head to position said backing member adjacent a selected one of said cutting and welding wheels.

4. A tool as claimed in claim 2 which further includes a rigid aluminum disk fastened to said fourth gear and adapted to rotate concentrically therewith, and magnetic means responsive to the rate of rotation of said aluminum disk for indicating the cutting or welding speed of said tool.

5. A tool as claimed in claim 4 in which said magnetic means includes a rigid frame structure rotatably mounted concentrically with said aluminum disk and freely revolvable with respect thereto, a magnet supported by said rigid frame structure adjacent the outer edge of said aluminum disk, said frame structure including a pointer adapted to normally point to a designated normal speed position, and which further includes a spiral-wound spring having one of its ends affixed to said operating head and its other end connected to said rigid frame structure for opposing rotational displacement thereof.

6. In a tool for sequentially cutting and then welding a predetermined length of plastic sheet material, said tool including a body structure having a cutting wheel and a welding wheel each rotatably mounted thereon and extending outwardly therefrom for engaging the plastic material, and also including means for electrically heating the welding surface of said welding wheel, the combination with said cutting and welding wheels of reversible counting means operable for being displaced from an initial setting position by a predetermined amount when said cutting wheel traverses a predetermined length of the plastic sheet material, and for being restored to said initial setting position when said welding wheel subsequently traverses an equal length of the material.

References Cited in the file of this patent

UNITED STATES PATENTS

| 700,286 | Arthur | May 20, 1902 |
| 2,759,090 | Frye | Aug. 19, 1956 |

FOREIGN PATENTS

| 666,823 | Great Britain | Feb. 20, 1952 |
| 1,141,677 | France | Mar. 18, 1957 |